Feb. 8, 1966   M. F. KAUFMAN ET AL   3,234,107
DIAGNOSTIC DEVICE
Filed Feb. 21, 1964
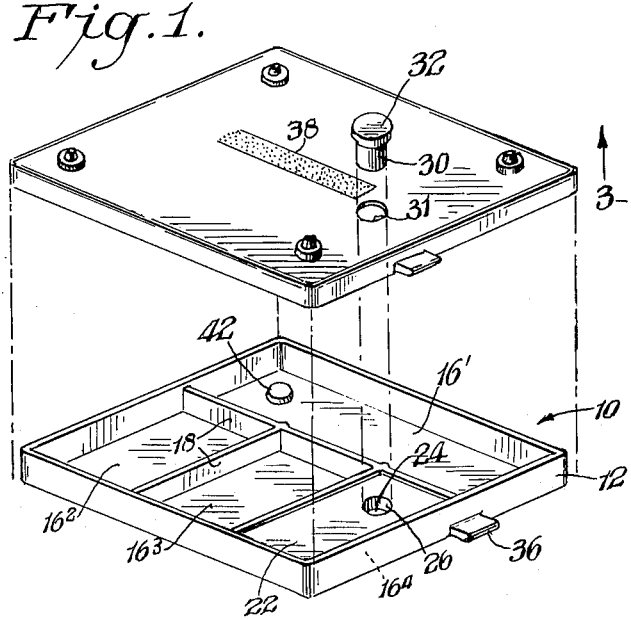
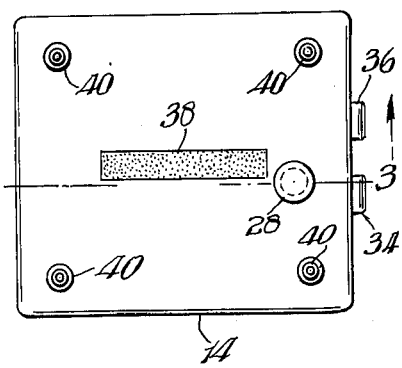
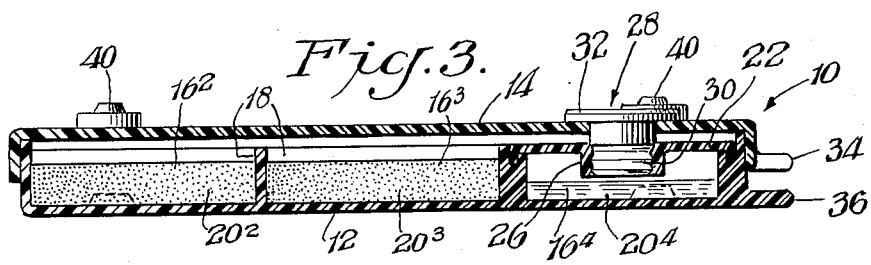
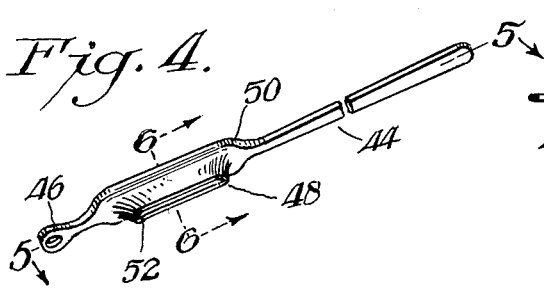
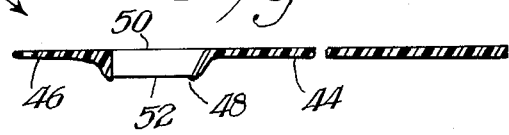
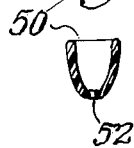
INVENTORS:
Mary F. Kaufman,
Kenneth B. Tate
BY Connolly and Hutz
ATTORNEYS United States Patent Office 3,234,107
Patented Feb. 8, 1966

3,234,107
DIAGNOSTIC DEVICE
Mary F. Kaufman, Hastings on Hudson, N.Y., and Kenneth B. Tate, Englewood, N.J., assignors to Chas. Pfizer & Co., Inc., New York, N.Y., a corporation of Delaware
Filed Feb. 21, 1964, Ser. No. 346,450
5 Claims. (Cl. 195—139)

This invention is concerned with diagnostic testing devices and more particularly with a container of hydrous nutritive media for the cultivation of microorganisms, and an inoculator for use therewith.

Bacteriological indentification and analysis entails inter alia the inoculation of a variety of culture media with the organism in question, followed by incubation and observation of the cultural characteristics. For diagnostic purposes the organism will also usually be subjected to antibiotic sensitivity testing. These identification and sensitivity tests ordinarily require the aseptic handling, incubation, cleaning and sterilizing of a variety of glass culture tubes, slides and dishes. The procedures are cumbersome and time-consuming, and laboratory facilities are generally required.

Accordingly, it is an object of the present invention to provide a diagnostic kit for conducting the described tests more simply and rapidly, and without elaborate facilities.

It is a further object to provide such a kit in an inexpensive form which may be readily incinerated after a single use, thereby completely eliminating cleaning and sterilization by the user.

Other objects and advantages will be apparent to those skilled in the art from the following description, in conjunction with the attached drawings, wherein FIG. 1 is an exploded perspective view of a preferred embodiment of the present invention;

FIG. 2 is a plan view of the embodiment shown in FIG. 1;

FIG. 3 is a sectional view, taken along the line 3—3 of FIG. 2;

FIG. 4 is a perspective view of an inoculator for use with the embodiment shown in FIG. 1;

FIG. 5 is a sectional view taken along the line 5—5 of FIG. 4; and

FIG. 6 is a sectional view taken along the line 6—6 of FIG. 4.

FIGS. 1-3 depict a diagnostic device 10 consisting of a tray 12 and a close-fitting removable lid 14, both formed of rigid transparent material, preferably a synthetic resin such as polystyrene or poly(methyl methacrylate). Partitions 18 divide tray 12 into a plurality of shallow, open-top compartments or cells 16(1)–16(4), of which 16(1) is preferably larger than the rest for a purpose to be explained. Cells 16 are each designed to contain a layer of hydrous culture medium 20, as shown in FIG. 3. Cells 16(1)–16(3) contain a variety of semi-solid media, while cell 16(4) contains a liquid medium 20(4) and is sealed by a transparent cover 22, suitably cemented in place. Cover 22 is pierced by an aperture 24, more or less centrally disposed in cover 22, for admission of the test organism to the liquid medium. Aperture 24 is preferably bordered by a depending skirt or dam 26 terminating above the floor of cell 16(4).

Removable lid 14 is provided with a dependent resilient stopper or closure 28 aligned with aperture 24 and suitably sized so as to seal the same when the lid is in place on the tray. Stopper 28, having a stem 30 and a flange 32, is preferably affixed to lid 14 by inserting stem 30 through an aperture 31 formed in lid 14 and superimposed on aperture 24. Lid 14 and tray 12 may be provided with a pair of laterally projecting, integral tabs 34 and 36, so disposed as to be adjacent but mutually displaced when the lid is on the tray, to facilitate removing the lid by finger pressure. Lid 14 also conveniently includes a small section of roughened surface 38 to accept pencil or crayon marking for indentification purposes. A boss 40 is molded in each corner of the top surface of lid 14, and corresponding depressions 42 are provided in the undersurface of tray 12, so that the assembled diagnostic devices can be conveniently stacked in quantity for shipment, storage and incubation.

FIGS. 4-6 depict an inoculator for use with device 10, consisting of a rod 44 formed suitably of a resilient plastic such as polyethylene. Rod 44 has a small loop 46 formed at one end thereof, and a longitudinally elongated specimen reservoir or spreader section 48 is positioned on rod 44 adjacent loop 46. The spreader section may consist of a porous material such as cotton, blotting paper or foamed plastic, affixed to the rod to serve as a reservoir for the liquid specimen containing the microorganism under test. In the particular embodiment shown, spreader section 48 consists of an elongated funnel having a mouth 50 and a constricted neck 52. Neck 52 is sufficiently narrow to retain a fluid specimen by surface tension until the lower surface thereof is drawn across the culture medium in cell 16(1), causing the specimen to be streaked in a band across the semi-solid medium.

The new diagnostic unit 10 is supplied with a variety of different culture media in the various individual cells, so that differential cultural characteristics can be observed, as an aid in identification of the microorganism under study. The selection of media will be influenced in part by the type of specimen whose testing is contemplated. Thus, for urine tests, cell 16(1) may contain blood agar; cell 16(2), alcohol agar; and cell 16(3), EMB (Eosin-Methylene Blue) agar. These are typical of the many semi-solid hydrous media which are appropriate. Similarly, the liquid medium in cell 16(4) may suitably be sodium thio glycollate broth, a standard nutrient medium which supports growth of some anaerobic organisms. Any liquid and semi-solid media may be substituted for those mentioned, as will be apparent to those skilled in the art.

The unit is assembled by placing the lid on the tray containing the aseptic culture media and inserting the stopper through apertures 31 and 24, simultaneously sealing both apertures and retaining the lid against accidental displacement. If desired, the assembled unit may be supplied to the user together with the inoculator rod in a flexible plastic envelope or otherwise conveniently packaged, singly or in quantity.

The user removes the lid by finger pressure on tabs 34 and 36 prior to inoculation. Both loop and spreader portions of the inoculator are inserted into the specimen of body fluid which is to be tested, so that a quantity of the fluid adheres thereto. The loop is then inserted into the nutrient broth 20(4) through aperture 24 to inoculate the liquid. The semi-solid media in cells 16(2) and 16(3) are streaked with the loop to inoculate, and finally the neck 52 of spreader or reservoir section 48 is drawn across the surface of the medium in cell 16(1), inoculating the medium in a wide band. A series of commercially available paper discs, impregnated with various antibiotics, may then be set into the inoculated medium in cell 16(1) if antibiotic sensitivity testing is contemplated. The extra size of cell 16(1) facilitates the simultaneous testing of a number of different antimicrobial agents in this manner.

Lid 14 is replaced on the tray, with the stopper in sealing position in apertures 31 and 24. The unit is now ready for incubation, but it is first inverted to avoid anomolous results due to condensation. In this position, added assurance against leakage is provided by dam 26, which confines liquid medium 20(4). Even if the quantity of liquid medium present inadvertently exceeds the capacity of cell 16(4) up to the top of the dam, as measured in the inverted position, the stopper still confines the liquid within the cell.

The time and temperature of the incubation will vary with the analytical problem, and the selection of appropriate conditions is within the skill of those versed in the art. After a typical incubation period of perhaps 24 hours at 37° C. the growth results are inspected and conclusions drawn. If for any reason it is desired to conduct further tests, or to repeat the experiment, the liquid contents of cell 16(4) serve as an appropriate source of the microorganism for inoculation of a fresh set of media. Afterward, the entire unit can be safely disposed of by incineration.

The new unit is useful for the testing of a variety of body fluids, including blood; urine; spinal fluid; ear, nose or throat specimens; various exudates; and the like. These may be fresh specimens, or they may have been previously incubated, for example, with an indicator such as triphenyltetrazolium chloride, which serves to detect the presence of high concentrations of actively metabolizing microorganisms.

The diagnostic device may be employed for isolation of microorganisms from mixed cultures, as well as for identification, sensitivity testing, and other microbiological purposes. The speed, convenience and versatility which are afforded will be obvious.

What is claimed is:

1. A disposable diagnostic device of transparent rigid construction comprising in combination a tray having a plurality of shallow open-top compartments formed therein, each compartment containing a hydrous culture medium at least one of which is in the liquid state, each of said liquid-containing compartments being sealed by a cover having an aperture for inoculation of the contents thereof, and a close-fitting removable lid for said tray provided with resilient closure means aligned with said apertures for releasably sealing said liquid compartments and simultaneously retaining said lid against accidental displacement from said tray.

2. A device as claimed in claim 1 wherein each of said apertures is bordered by a depending skirt terminating above the floor of said liquid compartment, to serve as a dam for said liquid medium when said device is inverted for incubation.

3. A device as claimed in claim 1 wherein said tray and said lid are each provided with a laterally projecting integral tab, said pair of tabs being disposed in adjacent mutually displaced positions when said lid is on said tray to facilitate the disengagement thereof.

4. A disposable diagnostic device of rigid transparent plastic comprising in combination a tray having a plurality of shallow open-top compartments formed therein, one of said compartments containing a liquid culture medium and being sealed by a cover pierced by a centrally disposed aperture surrounded by a dependent skirt terminating above the floor of said compartment, the remaining said compartments containing hydrous semi-solid culture media, a close-fitting removable tray lid pierced by a counterpart aperture superimposed on said first aperture when said lid is in position on said tray, and a resilient stopper inserted through said aperture pair in sealing relation therewith.

5. A disposable diagnostic kit comprising the device of claim 4 supplied in combination with an inoculator for said culture media comprising a rod of resilient plastic having a small loop formed at one end thereof and a longitudinally elongated specimen reservoir positioned on said rod adjacent said loop.

References Cited by the Examiner
UNITED STATES PATENTS
3,073,750  1/1963  Greenblatt _____ 195–139

A. LOUIS MONACELL, *Primary Examiner.*

ALVIN E. TANENHOLTZ, *Assistant Examiner.*